UNITED STATES PATENT OFFICE.

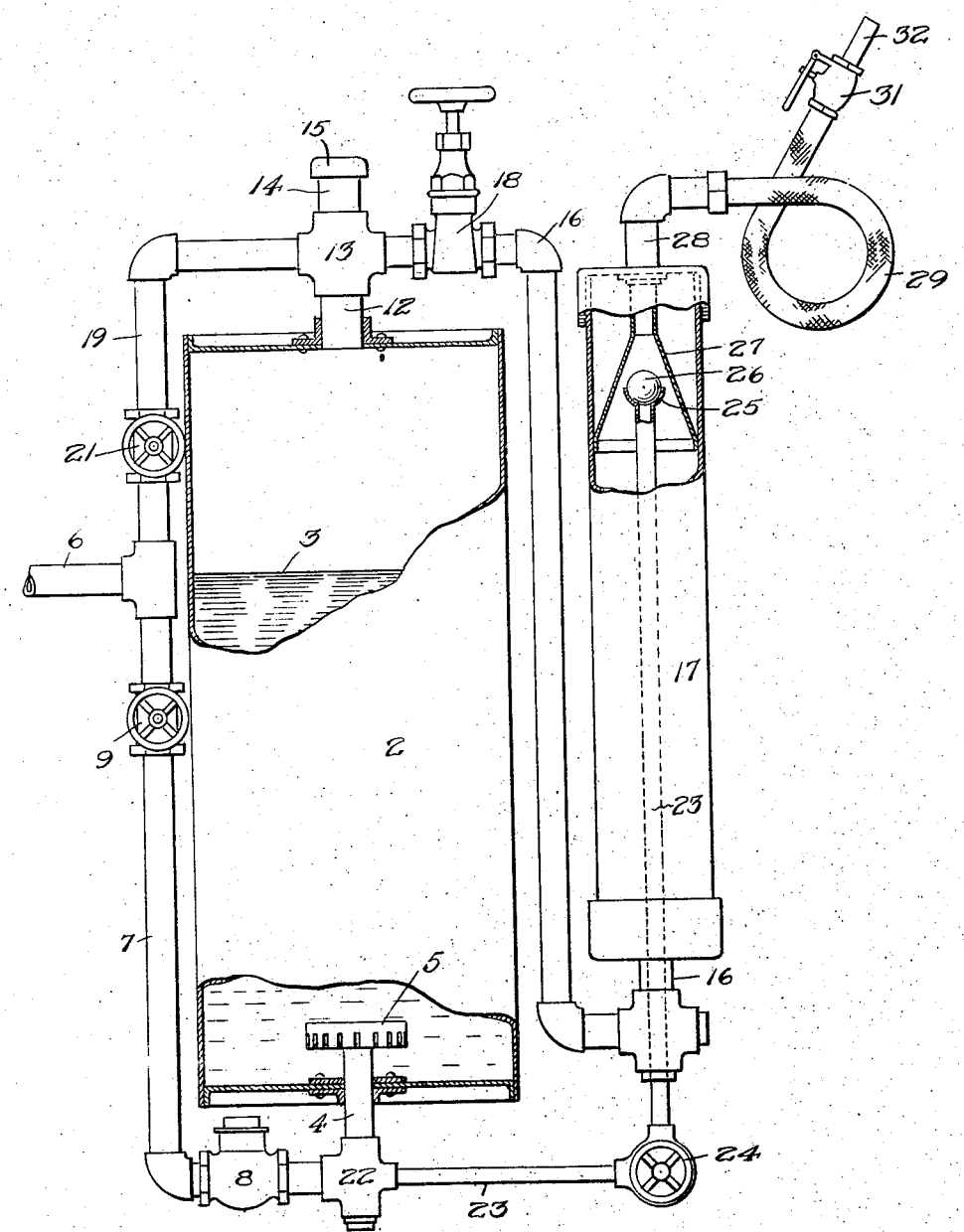

CLEMENT E. DUNN, OF BURLINGAME, CALIFORNIA.

PROCESS OF AND APPARATUS FOR APPLYING LIQUID TO SURFACES.

1,377,009.

Specification of Letters Patent.

Patented May 3, 1921.

Application filed September 19, 1916. Serial No. 120,970.

*To all whom it may concern:*

Be it known that I, CLEMENT E. DUNN, a citizen of the United States, and a resident of Burlingame, county of San Mateo, and State of California, have invented a certain new and useful Process of and Apparatus for Applying Liquid to Surfaces, of which the following is a specification.

The invention relates to a process of and apparatus for treating liquid or semi-liquid so that it may be discharged or projected against an object or surface for the purpose of covering or partially covering the object or surface with the liquid or semi-liquid or for disseminating the liquid in the air.

An object of the invention is to provide an apparatus for producing a projectable mixture of air and liquid.

Another object of the invention is to provide a process of saturating air under pressure with liquid.

A further object of the invention is to provide means for maintaining a substantially constant saturation of the air with varying quantities of liquid in the apparatus.

The invention possesses other advantageous features, some of which, with the foregoing, will be set forth at length in the following description, where I shall outline in full the process of the invention and that form of the apparatus which I have selected for illustration in the accompanying drawing. In said drawing I have shown one specific form of the apparatus of my invention, but it is to be understood that I do not limit myself to such form, since the apparatus may be embodied in a multiplicity of forms without departing from the invention as expressed in the claims.

The process and the apparatus are for the purpose of producing compressed air saturated with liquid or semi-liquid which may be projected into the air or against a surface. The liquid or semi-liquid may be paint, calcimine, disinfectant, preserving solution, spraying solution, or any other liquid which it is desired to disseminate.

The drawing is an elevation, partly in section, of one form of the apparatus of my invention.

The apparatus comprises a suitable closed tank 2 capable of withstanding internal pressure, into which the liquid 3 to be disseminated is charged. Arranged in the bottom of the tank and mounted on the pipe 4 is a distributer head 5, through which compressed air is introduced into the liquid, creating a pressure within the tank. The compressed air is delivered from the receiver through the pipes 6 and 7 to the distributer head pipe 4. The pipe 7 is provided with a check valve 8 and a manually operated valve 9 which is open when the apparatus is in operation. The air passing up through the liquid violently agitates the liquid maintaining it in substantially constant consistency at all parts. The feature is of particular advantage when the liquid is a mixture of non-miscible ingredients which tends to separate into its separate ingredients when the mixture is not agitated. Spraying solutions and mixtures of oil and water are of this nature and are perfectly handled by this apparatus.

Extending into the tank above the liquid is a pipe 12 which serves as an outlet pipe for the compressed air and as an inlet pipe for the liquid. The pipe 12 is connected to a four-way connection 13 to which is secured the liquid charging pipe 14 which is provided with a screw cap 15. Connected to another branch of the connection 13 is a pipe 16 which is connected to the closed chamber 17, a valve 18 being provided for closing off the flow of air when desirable. The chamber 17 acts as a receiving chamber for liquid which may be carried over with the air, particularly at the beginning of operations. The pipe 6 is also connected to the connection 13 by a pipe 19, provided with a valve 21, so that compressed air may be introduced directly into the upper part of the tank 2 when it is desired to blow out the liquid therein and so that compressed air may also be introduced into chamber 17 for similar purposes.

The pipes 4 and 7 are joined by a T 22, and connected to the T is a pipe 23 which extends upward into the chamber 17, preferably through the pipe 16. A valve 24 is arranged in pipe 23 for closing off or regulating the flow therethrough as desired. The pipe 23 is provided at its upper end within the chamber 17 with a cup 25 in which is seated a ball 26, preferably of solid metal. Surrounding the upper end of the pipe 23 is a cone 27, having an outlet of smaller diameter than the ball 26, which is connected to the discharge pipe 28, the distance between the cup 25 and the cone 27 being such that the ball cannot pass therebetween and the cone producing a constricted passage around the cup. Connected to the discharge pipe 28 is a hose or other flexible conductor 29 which is provided on its end with a nozzle 32 and a control valve 31.

In operation the compressed air passes from the upper part of tank 2 into the chamber 17 and when the valve 31 is opened, flows through the cone 27 and out through the discharge conductor. The liquid from tank 2 flows through pipe 23 and when the valve 31 is closed, stands at substantially the same level in pipe 23 as it does in the tank. When the valve 31 is opened, the pressure in the chamber 17 is reduced and the rush of air through the constricted area between the cup and the cone coöperate to raise the level of the liquid in pipe 23 so that it partly unseats the ball and flows out over the edge of the cup, where it is caught by the outrushing compressed air. The ball and cone also serve the function of preventing the discharge of the saturated compressed air from the chamber in the event that the hose should break. Under those conditions the high speed of the outrushing air causes the ball to seat in the upper part of the cone, effectively blocking the discharge of the saturated air.

I claim:

1. The process of projecting liquid, which consists in agitating a body of liquid with compressed air, charging said air with liquid by causing liquid to be drawn in an annularly formed spray into a rapidly moving current of said air thereby forming a mixture, forming said mixture into a solid stream, and discharging the mixture.

2. In an apparatus of the character described, means for agitating a body of liquid by passing air therethrough, a conductor through which said air passes in a rapidly moving stream, means for introducing an annular stream of said liquid into said air stream and a conductor extending from said first named conductor beyond the point of introduction of the annular stream and so shaped that the mixture is formed into a solid stream and subsequently discharged.

3. In an apparatus of the character described, a chamber through which air under pressure passes, a cone in said chamber through which the said air passes in a rapidly moving stream, a liquid conductor extending into said cone and a ball adapted to seat on the discharge end of said conductor.

4. In an apparatus of the character described, a chamber having a constricted outlet through which air passes and a ball arranged adjacent said outlet and adapted to be seated thereon by an excessive speed of the air passing said outlet to stop the flow therethrough.

5. In a spraying apparatus, a cone through which air passes and means in said cone operated by an excessive speed of air therethrough for blocking the passage of air through the cone.

6. In an apparatus of the character described, a vertical conductor through which a stream of air discharges, means for introducing liquid into said stream and means for collecting surplus liquid from said introducing means in the path of the stream of air whereby said stream passes therethrough.

7. The process of projecting liquid, which consists in agitating a body of liquid with compressed air, charging said air with liquid by causing liquid to be drawn in an annularly formed spray into a rapidly moving current of said air producing a mixture which is formed into a stream, compressing the stream and discharging the mixture.

8. In an apparatus of the character described, means for agitating a body of liquid by passing air therethrough, a conductor through which said air passes in a rapidly moving stream, means for introducing an annular stream of said liquid into said air stream, and a tapering passage having a restricted outlet to cause the mixture to be condensed into a stream substantially at the point where the air unites with the liquid, and for thereafter permitting the discharge of the liquid-impregnated air.

In testimony whereof, I have hereunto set my hand at San Francisco, California, this 12th day of September, 1916.

CLEMENT E. DUNN.

In presence of—
H. G. Prost.